United States Patent [19]

Channell

[11] 4,255,614
[45] Mar. 10, 1981

[54] METHOD AND APPARATUS FOR ENCLOSING A CABLE SPLICE

[76] Inventor: William H. Channell, 122 Oak Tree Dr., Glendora, Calif. 91740

[21] Appl. No.: 22,832

[22] Filed: Mar. 22, 1979

Related U.S. Application Data

[63] Continuation-in-part of Ser. No. 898,304, Apr. 20, 1978, abandoned.

[51] Int. Cl.³ .......................................... H02G 15/18
[52] U.S. Cl. .................................. 174/93; 174/77 R
[58] Field of Search ...................... 174/93, 77 R, 91; 215/274

[56] References Cited

U.S. PATENT DOCUMENTS

| | | | |
|---|---|---|---|
| 3,254,153 | 5/1966 | Kohler | 174/93 |
| 3,280,247 | 10/1966 | Channell et al. | 174/93 |

*Primary Examiner*—Roy N. Envall, Jr.
*Attorney, Agent, or Firm*—Christie, Parker & Hale

[57] ABSTRACT

A flexible coaxial cable splice for connecting service lines to a telephone cable in which the splice enclosure includes a tubular housing of resilient flexible material having integrally formed, radially offset tubular end portions which are inserted inside rigid annular collars. Tapered plugs surrounding the cables entering the housing are inserted through the open ends of the collars into the offset end portions of the housing. The collars each have an outer lip which engages the larger end of the tapered plug when the plug is in place. The lip of the collars acts to hold the plug in the surrounding offset portion of the tubular housing in compression to seal the interface between the plug and the housing.

10 Claims, 5 Drawing Figures

METHOD AND APPARATUS FOR ENCLOSING A CABLE SPLICE

CROSS REFERENCE TO RELATED APPLICATION

This application is a continuation-in-part of application Ser. No. 898,304, filed Apr. 20, 1978 now abandoned.

FIELD OF THE INVENTION

This invention relates to splice enclosures for telephone cable, and more specifically, relates to an elongated flexible splice housing.

The trend in modern housing developments has been to run all utility service, including telephone lines, underground. Individual service lines from each housing must be spliced into a multiline telephone cable running along the property lines of the houses. Some type of watertight junction box, such as described in my Pat. No. 3,848,074, has been used to allow a splicer to tie the service line from the house into the multiline cable. If not properly installed and sealed, however, the junction box may be a source of trouble. In addition, the splicer must be a highly skilled tradesman to insure that the connections between the service line and the multiline cable are properly completed.

To avoid these and other problems in the use of on-site installations of such junction boxes, ways have been sought to use pre-wired factory-installed splices. This requires that the cable splices be preformed at a central plant location and the cable with its pre-spliced service lines attached then transported to the location for installation. Because rather substantial lengths of cable may be involved, it is desirable that the individual splices be sealed in enclosures which are coaxial with the multiline cable and are sufficiently flexible and small enough in diameter that the spliced cable assembly can be wound on large spools for delivery to the installation site.

The current method of making such flexible splices in a cable assembly has been to lay the cable out in a large assembly area, complete the individual splices at the required intervals, and then seal the individual splices by means of a heat shrinkable material which is wrapped around the cable splice. A portable oven is moved from splice location to splice location to heat the sealing material. This material must then be allowed to cool to complete the shrinking process and to provide the necessary structural strength and stability to permit the cable to be moved and rolled onto the transporting spool. Such an arrangement is time-consuming as well as requiring a substantial capital investment in space and portable oven equipment. The heating process is also wasteful of energy.

SUMMARY OF THE INVENTION

The present invention is directed to an improved cable splice enclosure which is sufficiently thin and flexible to be readily wound on a spool as an integral part of the associated cable. The enclosure is easily installed to enclose the cable splice, providing moisture-proof protection, yet being thin and flexible enough to permit the cable with the splices installed to be wound tightly on a spool for storage and delivery to the cable assembly. This is accomplished, in brief, by providing a cable splice enclosure comprising an elongated tubular housing of resilient flexible elastomeric material which surrounds each splice connection of service lines to the cable. The ends of the tubular housing terminate in integrally formed radially offset tubular end portions having tapered inner surfaces. The offset portions are each inserted inside an annular collar having turned-in lips at either end which secure the collars against axial movement. Grommets through which the cables pass form plugs at either end of the enclosure. The plugs are tapered to engage the inner surfaces of the offset portions of the tubular housing within the collars. When in place, the larger diameter outer end of each tapered plug engages the lip at the outer edge of the respective collar to lock the plug in position.

DESCRIPTION OF THE DRAWINGS

For a more complete understanding of the invention reference should be made to the accompanying drawings, wherein.

DETAILED DESCRIPTION

Figure 1:
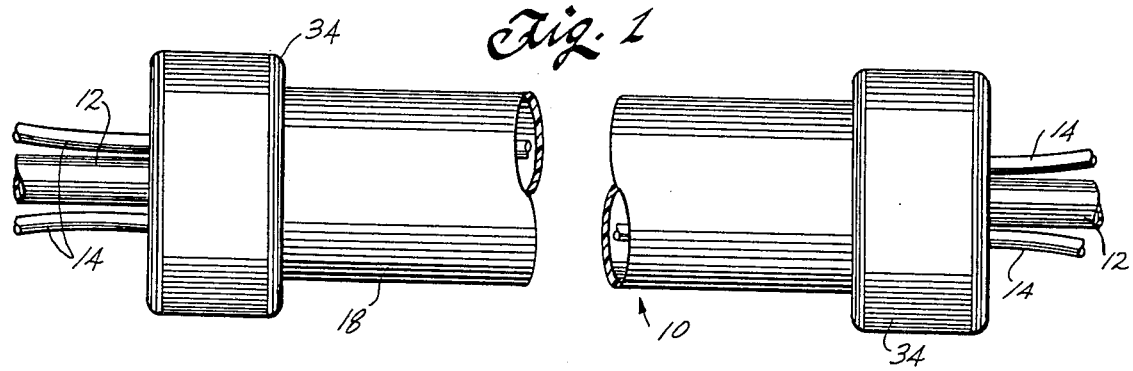
FIG. 1 is a side view of the splice enclosure.
Figure 2:
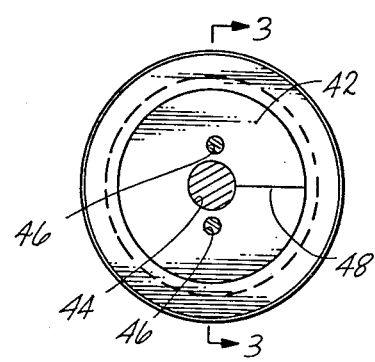
FIG. 2 is an end view of the splice enclosure.

Referring to the drawings in detail, the numeral 10 indicates generally the cable splice enclosure of the present invention. The enclosure is coaxial with a multiline telephone cable 12 to which one or more service lines are connected at a common splice, two service lines being indicated at 14. The service lines are spliced into the appropriate lines of the cable 12 within the housing 10 using conventional splicing techniques. Similar splices are made at intervals along the length of cable.

The enclosure 10 for the cable splice includes an elongated tubular housing member 18. The housing is molded, in a manner hereinafter described, from a resilient flexible material such as natural or synthetic rubbers or other well known elastomeric materials. The tubular shape of the housing element 18 is maintained by a coil spring 20 embedded in the walls of the housing. The coil spring 20 maintains the tubular shape of the housing while at the same time permitting the housing to be easily bent or flexed into an arcuate shape when the cable 12 is wound on a spool. The housing 18 is provided at each end with an integrally formed radially offset tubular end portion 22. The offset end portion forms an inner shoulder 24 and an outer shoulder 26 at the junction between the offset portion and the central portion of the housing 18. The inner surface 28 of the offset portion 22 is flared or tapered outwardly at an approximate taper of 5°. The outer edge of the offset portion is formed with a thin annular projection 30, the inner section between the tapered surface and the projection 30 forming a shoulder 32.

The offset end portions 22 of the housing 18 are each inserted in a rigid collar, indicated at 34. The collars are molded from a suitable rigid plastic, such as polyethylene. To secure the offset portion within the collars and hold the collars in place, each collar is formed with an inwardly projecting inner lip 38 which engages the shoulder 26 of the housing member 18. The outer edge of each collar 34 is formed with an inwardly projecting outer lip 40 which is formed with a smooth arcuate outer surface and with an inner undercut groove into which the thin outer portion 30 of the offset portion 22 of the housing fits. Because the housing is made of a flexible resilient material, the offset portion can be squeezed into the central space between the inner and outer lips of the collar. Once in place, the resilient material expands outwardly to its normal shape in which it fits snugly against the inner cylindrical surface of the collar.

Figure 3:
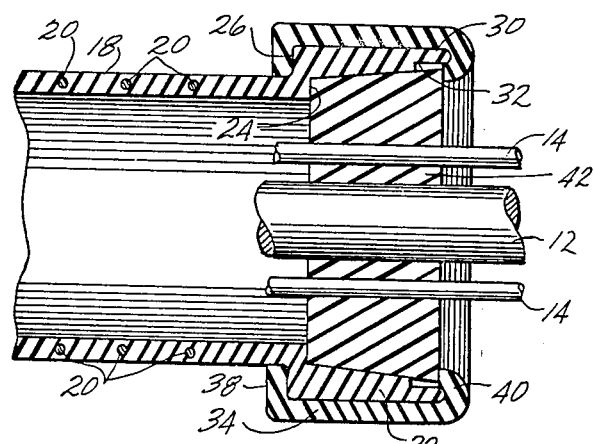
FIG. 3 is a partial sectional view taken substantially on the line 3—3 of FIG. 2.

A multiline cable and the service lines enter the housing through either end. To provide support for the cables and to provide a seal between the cables and the enclosure, a pair of grommets 42 are provided, one at either end. Each grommet is made of an elastomeric material such as natural or synthetic rubber and is shaped to form a tapered plug which is inserted into the offset portion 22 within the associated collar 34 of the housing 18. The outer surface of the grommet 42 is tapered to the same taper as the inner surface of the offset portion 22. The grommets are provided with a central hole 44 through which the large multiline cable 12 passes into the splice enclosure, and smaller off-center holes 46 through which the service lines 14 pass into the housing. The grommet 42 may be split, as indicated at 48, to permit the grommet to be expanded to slip over the cable 12. When in assembled position, as shown in FIG. 3, the grommet 42 is in a state of compression by the rigid collar, insuring moisture-tight seal at the tapered interface between the outside of the grommet 42 and the surrounding offset portion 22. The compression of the grommet also insures that the grommet clamps down securely around the cable and service lines where they pass through the holes 44 and 46. When in position, the grommet 42 seats against the inner shoulder 24 of the housing.

To insure that the grommet is placed in a state of compression and remains in place, the diameter of the smaller end of the tapered grommet is made substantially the same diameter as the opening formed by the lip 40, which in turn is approximately the same diameter of the tapered inner surface of the offset portion 22 as measured at the shoulder 32.

The enclosure of the present invention is installed by first inserting the ends of the service lines 14 through the openings of the grommet. The tubular housing portion is slipped over one end of the cable 12. The splice connection is then formed between the service lines 14 and the multiline cable 12. The split grommet is then spread sufficiently to slip onto the cable 12 adjacent one end of the splice. A suitable lubricant is applied to the outer surface of the grommet 42 and then the housing member 18, with the collars 34 in place, and the grommet 42 are forced together by inserting the tapered end of the grommet 42 into the opening in the adjacent collar. Once the grommet is seated against the inner shoulder 24, the outer edge of the grommet expands behind the lip 40 of the collar, locking the grommet in place. As pointed out above, the rigid collar 34 maintains the resilient material of the offset portion 22 and the grommet 42 in a state of compression so that the grommet clamps and seals the cable and service lines where they pass through the grommet, as well as sealing the interface between the grommet and the offset portion of the housing member. Once the grommet at one end of the enclosure is in place, the grommet at the other end of the enclosure is slipped over the multiline cable and compressed into the offset portion at the other end of the housing through the other collar 34, thereby fully enclosing the splice connection between the service lines 14 and the multiline cable 12. The enclosure with its flexible tubular housing 18, being coaxial with the multiline cable 12 and being flexible along its length, permits the cable assembly to be wrapped on a spool as each splice along the length of the cable is completed.

Figure 5:
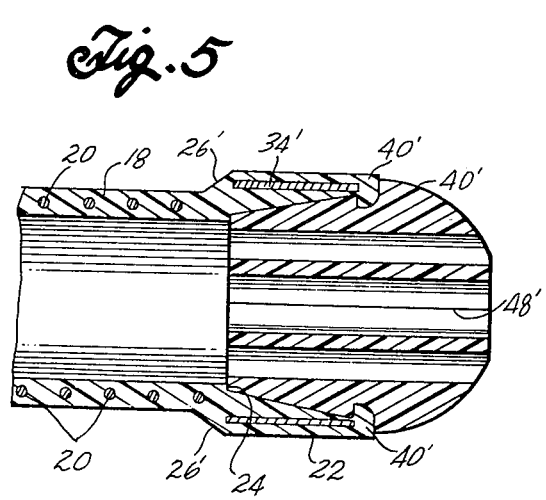
FIG. 5 is a sectional view similar to FIG. 3 showing an alternative embodiment to the present invention.

An alternative embodiment of the present invention is shown in FIG. 5. The tubular housing member 18 with its embedded coil spring 20 and integrally formed radially offset tubular end portions 22 is substantially the same as the arrangement of FIG. 1. However, in place of the separate rigid plastic collar 34, a cylindrical metal sleeve or band 34' is embedded in the end portion 22 during the molding process. The metal sleeve 34', like the collar 34 of FIG. 3, acts as a restraining element when the tapered grommet 42 is inserted in place. An integrally molded inner lip 40' on the outer edge of the offset end portion 22 holds the grommet against the inner shoulder 24. The grommet 42 may be molded with a rounded nose portion 42' which helps to center and guide the splice as it is drawn with the cable through underground conduit.

Figure 4:
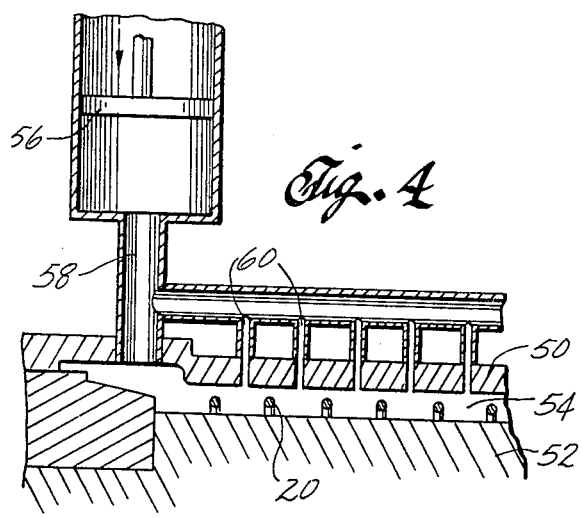
FIG. 4 is a partial sectional view of molding equipment used in explaining the method by which the housing is injection molded.

Referring to FIG. 4, there is shown in injection molding arrangement for molding the housing 18 with its embedded coil spring 20. The mold includes an outer annular female mold section 50 and an inner arbor 52 which form a cavity 54 which conforms to the desired shape of the molded housing 18 with its offset end portions 22. With the mold open, the coil spring 20 is slipped over the arbor 52 into the cavity 54. The uncured latex is then injected into the cavity under pressure by a suitable drive piston 56 which forces the latex through a passage 58 into the end of the cavity 54. A similar injection piston may be provided at the opposite end of the cavity so that the latex is injected from both ends. Such conventional molding technique is well known.

However, it was found that the consistency of the uncured molding material was such that the spring 20 was compressed from either end during the injection process and tended to remain compressed during the curing. It was found that this problem could be overcome by providing a manifold arrangement to individual injection passages 60 spaced along the length of the cavity 54. The position of the passages 60 is such that the uncured molding material is injected between each of the convolutions of the coil spring 20. This injection arrangement acts to balance any forces imposed on the spring 20 by the molding material as it is injected into the cavity 54.

What is claimed is:

1. A flexible cable splice enclosure comprising a tubular housing of soft resilient flexible material having integrally formed tubular end portions at either end, the tubular housing freely bending in an arc along its longitudinal axis, each end portion having a resilient tapered interior wall, means providing a continuous rigid nonexpandable band surrounding said tapered wall to limit outward expansion of the resilient flexible material forming said tapered wall, a tapered plug of resilient flexible material surrounding the cable inserted into each end portion of the tubular housing, and means forming a lip projecting radially inwardly of the tapered surface at the outer margins of the tapered walls for retaining the plugs in the end portions of the housing.

2. Apparatus of claim 1 wherein the means providing a rigid band is formed of a metal sleeve embedded in the tubular end portions.

3. Apparatus of claim 1 wherein the means providing a rigid band includes a collar formed of molded rigid plastic fitted snuggly around the outside of each tubular end portion.

4. The enclosure of claim 3 wherein each collar has a radially inwardly projecting lip around the outer margin, the lip extending inwardly of the inner surface of the tubular end portion, the lip forming an opening substantially the same size as the smaller end of the tapered plug, the larger end of the tapered plug engaging the inside of the lip of the collar to secure the plug in place within the offset end portion.

5. The enclosure of claim 3 wherein the rigid collar holds the plug and surrounding end portion of the housing in compression at the interface between the plug and surrounding end portion of the housing.

6. The enclosure of claim 3 wherein the rigid collar has a second lip at the inner margin thereof, the tubular housing extending through the opening formed by the second lip with the end portion having a shoulder engaging the inside of the second lip to secure the collar against axial movement relative to the housing.

7. The enclosure of claim 1 further including a coil spring coaxial with the tubular housing.

8. The enclosure of claim 8 wherein the coil spring is embedded in material forming the tubular housing.

9. Apparatus of claim 2 wherein the outer edge of the tubular end portions are formed with a radially inwardly projecting lip.

10. A flexible cable splice enclosure which bends with the cable, comprising: a tubular housing of resilient flexible material having an integrally formed radially offset tubular end portion at each end, the offset end portions having an inner diameter slightly larger than the inner diameter of the housing, the inner surface of the end portions being tapered to provide a larger diameter toward the outer edge of the end portions, means forming a non-expandable band around each of the end portions, tapered plugs fitting snuggly into the tapered inner surfaces of the end portions within the means forming a band, the band means holding the tapered plugs in a state of compression, each plug having at least one opening for receiving a cable, coil spring means imbedded in the housing between the end portions for holding the flexible material in a tubular shape while allowing the housing to bend freely, and means forming a lip projecting radially inwardly at the outer ends of the housing for engaging the plugs and retaining the plugs in the end portions.

* * * * *

UNITED STATES PATENT AND TRADEMARK OFFICE
CERTIFICATE OF CORRECTION

PATENT NO. : 4,255,614
DATED : March 10, 1981
INVENTOR(S) : William H. Channell

It is certified that error appears in the above-identified patent and that said Letters Patent are hereby corrected as shown below:

Column 6, line 3, claim 8, after "claim", "8" should read -- 7 --.

Signed and Sealed this

Twenty-sixth Day of May 1981

[SEAL]

Attest:

RENE D. TEGTMEYER

*Attesting Officer*  *Acting Commissioner of Patents and Trademarks*